(12) United States Patent
Li et al.

(10) Patent No.: US 12,176,552 B2
(45) Date of Patent: Dec. 24, 2024

(54) BATTERY CELL HAVING INTERNAL PROTECTIVE LAYER, AND ELECTRIC DEVICE

(71) Applicant: Ningde Amperex Technology Limited, Ningde (CN)

(72) Inventors: Lei Li, Ningde (CN); Hua Zhou, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 247 days.

(21) Appl. No.: 17/705,743

(22) Filed: Mar. 28, 2022

(65) Prior Publication Data

US 2022/0320646 A1    Oct. 6, 2022

(30) Foreign Application Priority Data

Mar. 31, 2021   (CN) .......................... 202110351085.8

(51) Int. Cl.
| | |
|---|---|
| *H01M 50/178* | (2021.01) |
| *H01M 50/105* | (2021.01) |
| *H01M 50/54* | (2021.01) |
| *H01M 50/55* | (2021.01) |
| *H01M 50/557* | (2021.01) |
| *H01M 50/586* | (2021.01) |

(52) U.S. Cl.
CPC ....... *H01M 50/178* (2021.01); *H01M 50/105* (2021.01); *H01M 50/54* (2021.01); *H01M 50/55* (2021.01); *H01M 50/557* (2021.01); *H01M 50/586* (2021.01)

(58) Field of Classification Search
CPC ............ H01M 50/178; H01M 50/586; H01M 50/105; H01M 50/54; H01M 50/55; H01M 50/557
See application file for complete search history.

(56) References Cited

U.S. PATENT DOCUMENTS

2004/0224227 A1* 11/2004 Ozawa ................ H01M 50/124
                                                               429/211
2010/0081052 A1*  4/2010 Morishima ......... H01M 50/533
                                                               429/231.95

FOREIGN PATENT DOCUMENTS

WO     WO-2005106988 A1 * 11/2005    ........ H01M 10/0436

OTHER PUBLICATIONS

English Translation of WO 2005106988 (Year: 2005).*

* cited by examiner

*Primary Examiner* — Jimmy Vo
(74) *Attorney, Agent, or Firm* — Ladas & Parry LLP

(57) ABSTRACT

A battery cell includes an electrode assembly and a packaging bag configured to accommodate the electrode assembly. The electrode assembly includes a first electrode plate, a separator, and a second electrode plate that are stacked. A first tab is disposed on the first electrode plate. The first tab protrudes from the packaging bag. The first tab includes a connecting portion accommodated in the packaging bag. A first insulation layer is disposed on the connecting portion. The first insulation layer includes a free end towards the electrode assembly.

20 Claims, 6 Drawing Sheets

BATTERY CELL HAVING INTERNAL PROTECTIVE LAYER, AND ELECTRIC DEVICE

CROSS REFERENCE TO RELATED APPLICATION

This application claims priority to the Chinese Patent Application Ser. No. 202110351085.8, filed on Mar. 31, 2021, the content of which is incorporated herein by reference in its entirety.

TECHNICAL FIELD

This application relates to the technical field of batteries, and in particular, to a battery cell and an electric device.

BACKGROUND

A battery cell is a device that converts chemical energy into electrical energy, and can supply power to an external electric device (such as a portable electronic device) when necessary. The battery cell includes an electrode assembly and a tab. The electrode assembly includes a first electrode plate, a separator, and a second electrode plate. The first electrode plate and the second electrode plate are connected to different tabs. To protect the tabs, a tab adhesive is usually affixed onto the tabs.

SUMMARY

In a process of implementing this application, the applicant of this application finds that: currently, the tab adhesive is bonded to both sides of the tab. On a surface of the tab in existing battery cell products, as hampered by a processing conditions and other factors, an end of the tab towards the electrode assembly is exposed. To be specific, on a surface of the tab towards the packaging bag, a joint between the tab and the electrode assembly is exposed. With the joint exposed, the burrs on the tab or the electrode plate are prone to pierce the packaging bag to cause corrosion.

In view of the foregoing problem, an embodiment of this application provides a battery cell and an electric device to reduce the risk of exposing a joint between a tab and an electrode assembly, so as to reduce the hazard that the burrs on the tab or the electrode plate are prone to pierce the packaging bag to cause corrosion, where the burrs include weld burrs and/or cutting burrs.

According to an aspect of the embodiment of this application, a battery cell is provided, including an electrode assembly, a packaging bag configured to accommodate the electrode assembly, a first tab, and a first insulation layer. The electrode assembly includes a first electrode plate, a separator, and a second electrode plate that are stacked in sequence. The first tab is disposed on the first electrode plate. The first tab protrudes from the packaging bag. The first tab includes a connecting portion accommodated in the packaging bag. The first insulation layer is disposed on the connecting portion. The first insulation layer includes a free end towards the electrode assembly. The free end does not need to be bonded to the first tab, and the free end is adaptable to the connecting portions of different sizes. As hampered by the position of a processing device, a conventional tab adhesive is unable to sufficiently bond to the first tab to protect the joint between the first tab and the first electrode plate during processing. A solution is to dispose a non-adhesive free end on the first insulation layer, and therefore, after the processing device releases the working space, the free end can automatically cover the end of the first tab towards the electrode assembly, so as to protect the joint. This reduces the hazard that the first tab or the first electrode plate is prone to pierce the packaging bag to cause corrosion.

In an optional implementation, the first insulation layer includes a substrate layer and an adhesive layer disposed on the substrate layer. The adhesive layer bonds to the first tab. The free end is an exposed substrate layer. In this way, the free end is bonded to the first tab through the adhesive layer that is adhesive, thereby overcoming the following problem in the prior art: as limited by the processing conditions, the joint between the first tab and the first electrode plate is unable to be bonded to the insulation layer and is unable to be protected against burrs.

In an optional implementation, along a direction in which the first tab extends beyond the first electrode plate, a length of the free end is L, where $0.5 \text{ mm} \leq L \leq 8 \text{ mm}$.

In an optional implementation, $0.6 \text{ mm} \leq L \leq 3 \text{ mm}$.

In an optional implementation, $1.5 \text{ mm} \leq L \leq 3 \text{ mm}$. The length L of the free end may vary with the preparation technique in the process of preparing the battery cell. For example, when the external device part occupies a relatively large working space, the length of the free end may be increased appropriately. When the external device part occupies a small space, the length of the free end may be decreased.

In an optional implementation, along a direction in which the first tab extends beyond the first electrode plate, the separator extends beyond the first electrode plate. Along a thickness direction of the battery cell, an orthographic projection of the free end of the first insulation layer meets or overlaps an orthographic projection of the separator. In this way, the first electrode plate and the second electrode plate of the battery cell are not prone to a short circuit caused by contact at the joint between the first electrode plate and the first tab.

In an optional implementation, along the direction in which the first tab extends beyond the first electrode plate, the first electrode plate extends beyond the second electrode plate. Along the thickness direction of the battery cell, the orthographic projection of the free end of the first insulation layer is spaced apart from an orthographic projection of the second electrode plate. In this way, the free end of the first insulation layer protects the joint between the first tab and the first electrode plate without increasing the thickness of the battery cell at an end of the second electrode plate towards the second tab.

In an optional implementation, along the direction in which the first tab extends beyond the first electrode plate, the first electrode plate extends beyond the second electrode plate. Along the thickness direction of the battery cell, the orthographic projection of the free end of the first insulation layer meets the orthographic projection of the second electrode plate. In this way, on the one hand, the free end of the first insulation layer protects the joint between the first tab and the first electrode plate. On the other hand, the disposition of the free end of the first insulation layer does not increase the thickness of the battery cell at an end of the second electrode plate towards the second tab.

In an optional implementation, the first tab includes a first surface and a second surface that are disposed opposite to each other. The first insulation layer is disposed on the first surface. A second insulation layer is disposed on the second surface. Along a direction in which the first tab extends beyond the first electrode plate, a length of the second insulation layer is greater than a length of the first insulation layer. With the second insulation layer disposed, the second insulation layer protects the joint between the first tab and the first electrode plate, thereby reducing the hazard that the first tab or the first electrode plate is prone to pierce the packaging bag to cause corrosion.

In an optional implementation, along the thickness direction of the battery cell, the orthographic projection of an end of the second insulation layer towards the electrode assembly is spaced apart from or meets the orthographic projection of the second electrode plate. In this way, the disposition of the second insulation layer does not increase the thickness of the battery cell at an end of the second electrode plate towards the second tab.

In an optional implementation, along a direction in which the free end points to the first electrode plate, a length by which the second insulation layer extends beyond the first insulation layer is $\Delta L$, where $0<\Delta L \leq 3$ mm. In this way, on the one hand, the second insulation layer disposed reduces the hazard that the first tab or the first electrode plate is prone to pierce the packaging bag to cause corrosion. On the other hand, the disposition of the second insulation layer does not affect the performance of the battery cell.

In an optional implementation, the first tab includes a plurality of first tab units stacked and a conductive piece welded and connected to the plurality of first tab units. The connecting portion includes a weld region; the plurality of first tab units are welded and connected to the conductive piece through the weld region.

In an optional implementation, the first electrode plate includes a current collector and an active layer disposed on the current collector. The current collector protrudes from the first electrode plate to form the first tab. To be specific, the current collector extends to form the first tab. The first tab and the current collector are integrally formed.

In an optional implementation, the active layer extends beyond the first electrode plate and is disposed on the first tab. A distance by which the active layer extends beyond the first electrode plate is not greater than 0.9 mm. To be specific, the active layer extends onto the first tab. The first tab is connected to the current collector. Along the direction in which the first tab extends beyond the first electrode plate, the length of the active layer located on the first tab from the joint between the current collector and the first tab to the end of the active layer away from the current collector is not greater than 0.9 mm. In this way, the limited accommodation space of the packaging bag can accommodate a relatively large amount of active materials on the active layer.

In an optional implementation, a thickness of the battery cell is H, where $0$ mm$<H\leq 3$ mm. To be specific, the battery cell in this application is an ultra-thin cell, and the thickness of the ultra-thin cell is H, where $0$ mm$<H\leq 3$ mm.

In an optional implementation, $1.5$ mm$\leq H\leq 1.8$ mm.

In an optional implementation, an optional thickness of the battery cell is 1.8 mm.

In an optional implementation, an optional thickness of the battery cell is 0.8 mm.

In an optional implementation, the packaging bag includes a first bag body and a second bag body. A first recess is disposed on the first bag body. An edge of the second bag body is connected to an edge of the first bag body to form a sealing body and a sealing portion. The electrode assembly is accommodated in the sealing body. The first tab is sandwiched at the sealing portion. The first recess fits the second bag body to form the sealing body. To be specific, an opening of the first recess is covered by the second bag body to form the sealing body. The electrode assembly is accommodated in the first recess.

In an optional implementation, a second recess is disposed on the second bag body. The first recess fits the second recess to form the sealing body. The electrode assembly is accommodated in the first recess and the second recess.

In an optional implementation, a tab adhesive is applied to both surfaces of the first tab sandwiched at the sealing portion. The tab adhesive is configured to seal a joint between the first tab and the sealing portion. In this way, the battery cell is not prone to electrolyte leakage at the joint between the first tab and the packaging bag.

In an optional implementation, the first insulation layer includes a first end away from the free end. The first end overlaps the tab adhesive.

In an optional implementation, the tab adhesive includes a first part, a second part, and a third part that are connected in sequence. The first part is located in the packaging bag. The second part is sandwiched at the sealing portion. The third part is located outside the packaging bag. The first part overlaps an end of the first insulation layer away from the electrode assembly. To be specific, the first part of the tab adhesive overlaps the first end of the first insulation layer, and the free end of the first insulation layer is bonded to the tab adhesive through the adhesive layer.

In an optional implementation, the first tab extends flat and straight out of the packaging bag. In this way, the first tab does not need to be bent in the packaging bag, and the thickness of the battery cell is not increased.

According to one aspect of the embodiments of this application, an electric device is provided. The electric device includes a load and the battery cell. The load is electrically connected to the battery cell.

Beneficial effects of the embodiments of this application are: a battery cell and an electric device are provided, where the battery cell includes an electrode assembly, a packaging bag configured to accommodate the electrode assembly, a first tab, and a first insulation layer. The electrode assembly includes a first electrode plate, a separator, and a second electrode plate that are stacked in sequence. The first tab is disposed on the first electrode plate. The first tab protrudes from the packaging bag. The first tab includes a connecting portion accommodated in the packaging bag. The connecting portion is configured to connect the first tab and the first electrode plate. The first insulation layer is disposed on the connecting portion. The first insulation layer includes a free end towards the electrode assembly. The free end is configured to protect the joint between the first tab and the first electrode plate. With the first insulation layer disposed at the connecting portion of the first tab, where the first insulation layer includes a free end towards the electrode assembly, the joint between the first tab and the first electrode plate is protected by the free end of the first insulation layer, thereby reducing the hazard that the first tab or the first electrode plate is prone to pierce the packaging bag to cause corrosion of the battery cell.

BRIEF DESCRIPTION OF DRAWINGS

One or more embodiments are described exemplarily with reference to accompanying drawings corresponding to the embodiments. The exemplary description does not constitute any limitation on the embodiments. Components marked with the same reference numeral in the drawings represent similar components. Unless otherwise specified, the drawings do not constitute any scale limitation.

DETAILED DESCRIPTION

For ease of understanding this application, the following describes this application in more detail with reference to drawings and specific embodiments. It needs to be noted that an element referred to herein as "fixed to" another element may directly exist on the other element, or may be fixed to the other element through one or more intermediate elements. An element referred to herein as "connected to" another element may be connected to the other element directly or through one or more intermediate elements. The terms "vertical", "horizontal", "left", "right", "in", "out" and other similar expressions used herein are merely for ease of description.

Unless otherwise defined, all technical and scientific terms used herein have the same meanings as what is generally understood by a person skilled in the technical field of this application. The terms used in the specification of this application are merely intended to describe specific embodiments but not to limit this application. The term "and/or" used herein is intended to include any and all combinations of one or more related items preceding and following the term.

Figure 1:
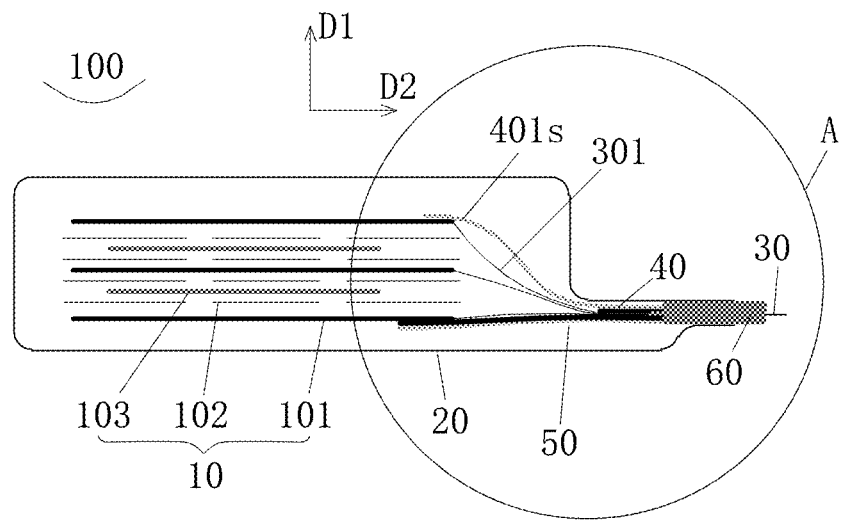
FIG. 1 is a schematic sectional view of a battery cell in an implementation according to an embodiment of this application.
Figure 2:
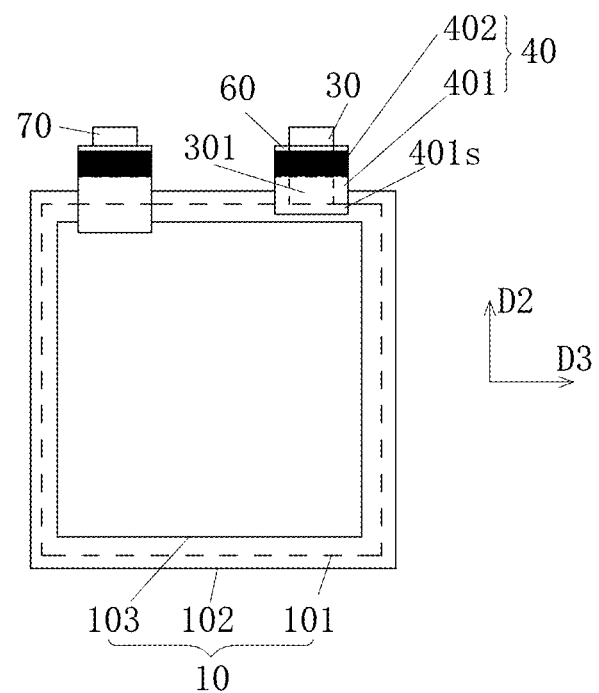
FIG. 2 is a partial schematic diagram of a battery cell in an implementation according to an embodiment of this application.

Referring to FIG. 1 and FIG. 2, the battery cell 100 includes: an electrode assembly 10, a packaging bag 20 configured to accommodate the electrode assembly 10, a first tab 30, a first insulation layer 40, a second insulation layer 50, and a tab adhesive 60. The electrode assembly 10 includes a first electrode plate 101, a separator 102, and a second electrode plate 103. The first electrode plate 101, the separator 102, and the second electrode plate 103 are stacked in sequence. The first tab 30 is connected to the first electrode plate 101. The first tab 30 protrudes from the packaging bag 20. The first tab 30 includes a connecting portion 301 accommodated in the packaging bag 20. The first insulation layer 40 is disposed on the connecting portion 301. The first insulation layer 40 includes a free end 401s towards the electrode assembly 10. The second insulation layer 50 and the first insulation layer 40 are disposed on two surfaces of the first tab 30, and are opposite to each other. The tab adhesive 60 is configured to seal the first tab 30 and the packaging bag 20. With the first insulation layer 40 disposed at the connecting portion 301 of the first tab 30, where the first insulation layer 40 includes a free end 401s towards the electrode assembly 10, the joint between the first tab 30 and the first electrode plate 101 is protected by the free end 401s, thereby reducing the hazard that the first tab 30 or the first electrode plate 101 is prone to pierce the packaging bag 20 to cause corrosion of the battery cell 100.

With respect to the electrode assembly 10, referring to FIG. 1, the electrode assembly 10 includes a first electrode plate 101, a separator 102, and a second electrode plate 103 that are stacked in sequence. A direction in which the first electrode plate 101, the separator 102, and the second electrode plate 103 are stacked in sequence is a thickness direction D1 of the battery cell 100.

Figure 3:
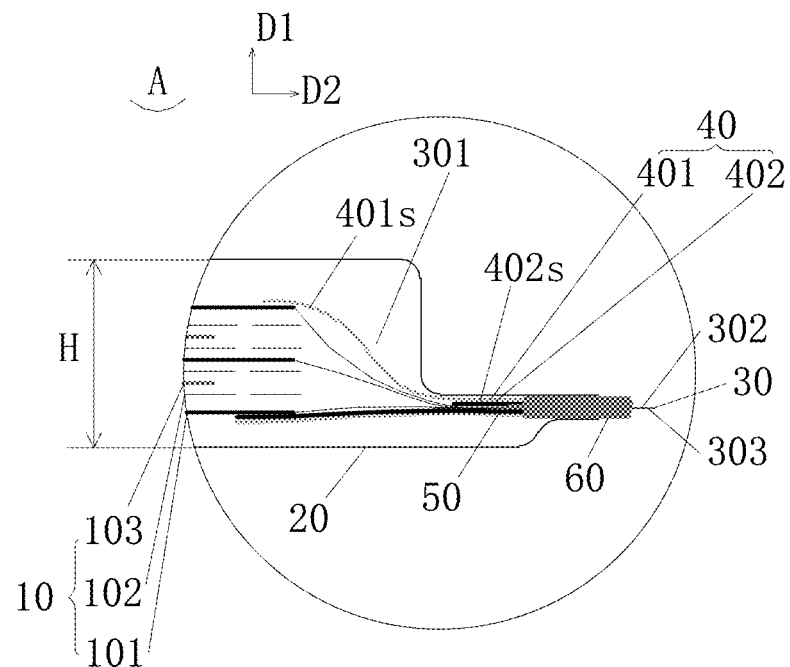
FIG. 3 is a manifestation of an enlarged view of part A shown in FIG. 1 according to an embodiment of this application.

It needs to be noted that, referring to FIG. 3, the number of the first electrode plates 101, the number of the separators 102, and the number of the second electrode plates 103 each are at least one. The battery cell 100 in this embodiment of this application may be an ultra-thin cell 100. Along the thickness direction D1 of the battery cell 100, the thickness of the ultra-thin cell 100 is H, where 0 mm<H≤3 mm. In another embodiment, 1.5 mm≤H≤1.8 mm.

It needs to be noted that the first electrode plate 101 includes a current collector (not shown in the drawing) and an active layer (not shown in the drawing) disposed on the current collector. In some embodiments, the current collector protrudes from the first electrode plate 101 to form the first tab 30. To be specific, the current collector extends to form the first tab 30, and the current collector and the first tab 30 are integrally formed.

It needs to be noted that a method for integrally forming the current collector and the first tab 30 is to trim the current collector to form the first tab 30.

It needs to be noted that in some embodiments, the first tab 30 is welded to the current collector.

In some embodiments, the active layer extends beyond the first electrode plate 101 and is disposed on the first tab 30. Along the direction D2 in which the first tab 30 extends beyond the first electrode plate 101, the distance by which the active layer extends beyond the first electrode plate 101 is not greater than 0.9 mm. To be specific, the active layer extends to the first tab 30. The first tab 30 is connected to the current collector. Along the direction D2 in which the first tab 30 extends beyond the first electrode plate 101, the length of the active layer located on the first tab 30 from the joint between the current collector and the first tab 30 to the end of the active layer away from the current collector is not greater than 0.9 mm. In this way, the limited accommodation space of the packaging bag 20 can accommodate a relatively large amount of active materials on the active layer.

It needs to be noted that in some embodiments, during the processing and preparation of the first electrode plate 101 and the first tab 30, the active layer is formed on the current collector. The edge of the active layer naturally forms a thinned region. When the current collector and the active layer are trimmed to form the first tab 30, the thinned region is usually cut away to achieve uniform thickness of the active layer of the first electrode plate 101. The first tab 30 and the first electrode plate 101 are integrally cut into shape. In this way, the end of the first tab 30 connected to the first electrode plate 101 is coated with the active layer.

It needs to be noted that the second electrode plate 103 and the first electrode plate 101 possess the same structure. However, the polarity of the second electrode plate 103 is opposite to the polarity of the first electrode plate 101.

Figure 4:
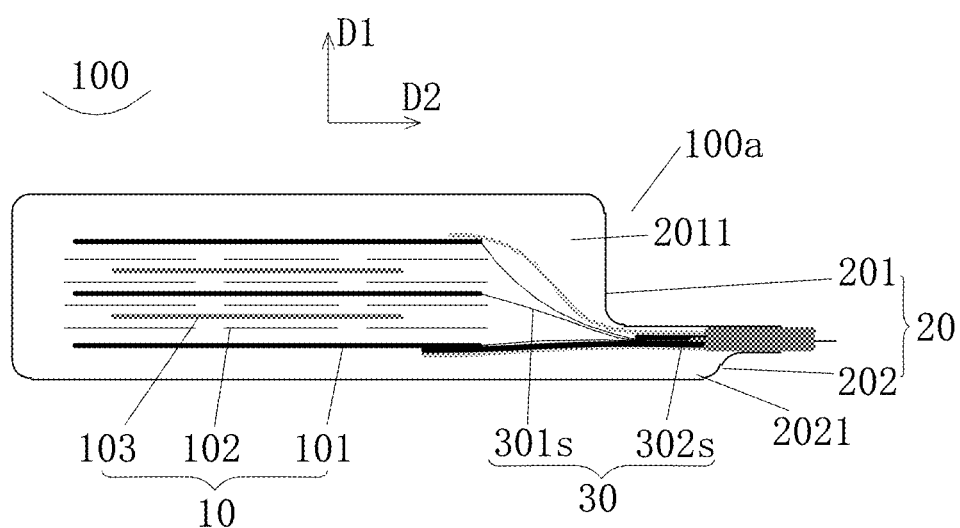
FIG. 4 is another manifestation of FIG. 1 according to an embodiment of this application.
Figure 5:
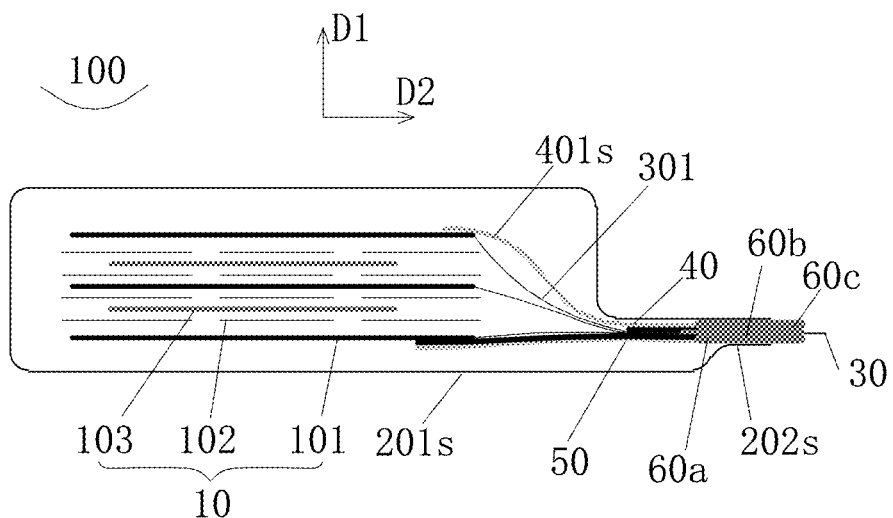
FIG. 5 is still another manifestation of FIG. 1 according to an embodiment of this application.

With respect to the packaging bag 20 and the tab adhesive 60, referring to FIG. 4 and FIG. 5, the packaging bag 20 includes a first bag body 201 and a second bag body 202. The edge of the first bag body 201 is connected to the edge of the second bag body 202 to form a sealing body 201s and a sealing portion 202s. The electrode assembly 10 is accommodated in the sealing body 201s. The first tab 30 is sandwiched at the sealing portion 202s. A tab adhesive 60 is applied to both surfaces of the first tab sandwiched at the sealing portion 202s. The tab adhesive 60 is configured to seal the joint between the first tab 30 and the sealing portion 202s. In this way, the battery cell 100 is not prone to electrolyte leakage at the joint between the first tab 30 and the packaging bag 20.

Understandably, at the sealing portion 202s, the first tab 30 protrudes from the packaging bag 20.

It needs to be noted that, in some embodiments, the tab adhesive 60 overlaps an end of the first insulation layer 40 away from the electrode assembly 10.

It needs to be noted that, referring to FIG. 1 and FIG. 5, the tab adhesive 60 includes a first part 60a, a second part 60b, and a third part 60c that are connected in sequence. The first part 60a is located in the packaging bag 20. The second part 60b is sandwiched at the sealing portion 202s. The third part 60c is located outside the packaging bag 20. The first part 60a of the tab adhesive 60 overlaps the end of the first insulation layer 40 away from the electrode assembly 10.

It needs to be noted that, in some embodiments, referring to FIG. 2 and FIG. 5, the second tab 70 is disposed on the second electrode plate 103. The second tab 70 is sandwiched at the sealing portion 202s of the packaging bag 20. The tab adhesive 60 is applied to both surfaces of the second tab sandwiched at the sealing portion 202s. The tab adhesive 60 is configured to seal the joint between the second tab 70 and the sealing portion 202s. The first tab 30 forms the positive tab, and the second tab 70 forms the negative tab, of the battery cell 100.

It needs to be noted that, in some embodiments, referring to FIG. 4, the first bag body 201 is provided with a first recess 2011. The first recess 2011 is formed by recessing the first bag body 201 away from the second bag body 202. The second bag body 202 is provided with a second recess 2021. The second recess 2021 is formed by recessing the second bag body 202 away from the first bag body 201. The first recess 2011 and the second recess 2021 form the sealing body 201s. The electrode assembly 10 is accommodated in the sealing body 201s.

It needs to be noted that, referring to FIG. 4 and FIG. 5, in some embodiments, along the direction D2 in which the first tab 30 protrudes from the packaging bag 20, the size of the first recess 2011 is different from the size of the second recess 2021. When junctions between the plurality of first tab units 301s and the conductive piece 302s are located in the second recess 2021, along the direction D2 in which the first tab 30 protrudes from the packaging bag 20, the size of the first recess 2011 is less than the size of the second recess 2021. In this way, outside the battery cell 100, a vacancy 100a is formed at the position located in the first recess 2011 and towards the first tab 30. The vacancy 100a is available to an external electric device. The overall size of the battery cell 100 is smaller, and the application scope of the battery cell 100 is wider.

Figure 6:
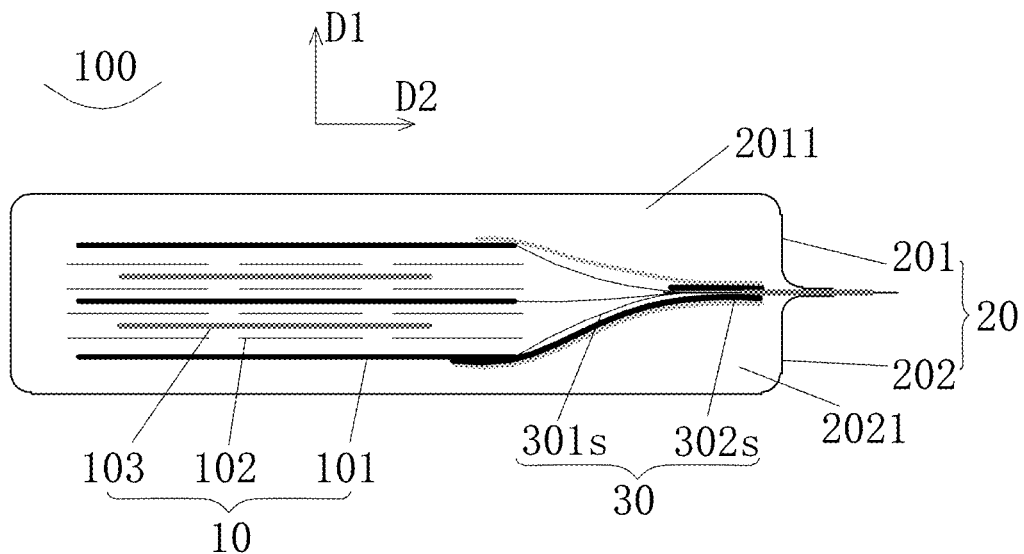
FIG. 6 is a schematic sectional view of a battery cell in still another implementation according to an embodiment of this application.

It needs to be noted that, referring to FIG. 6, in some embodiments, along the direction D2 in which the first tab 30 protrudes from the packaging bag 20, the size of the first recess 2011 is the same as the size of the second recess 2021. The junctions between the plurality of first tab units 301s and the conductive piece 302s are located between the second recess 2021 and the first recess 2011.

Figure 7:
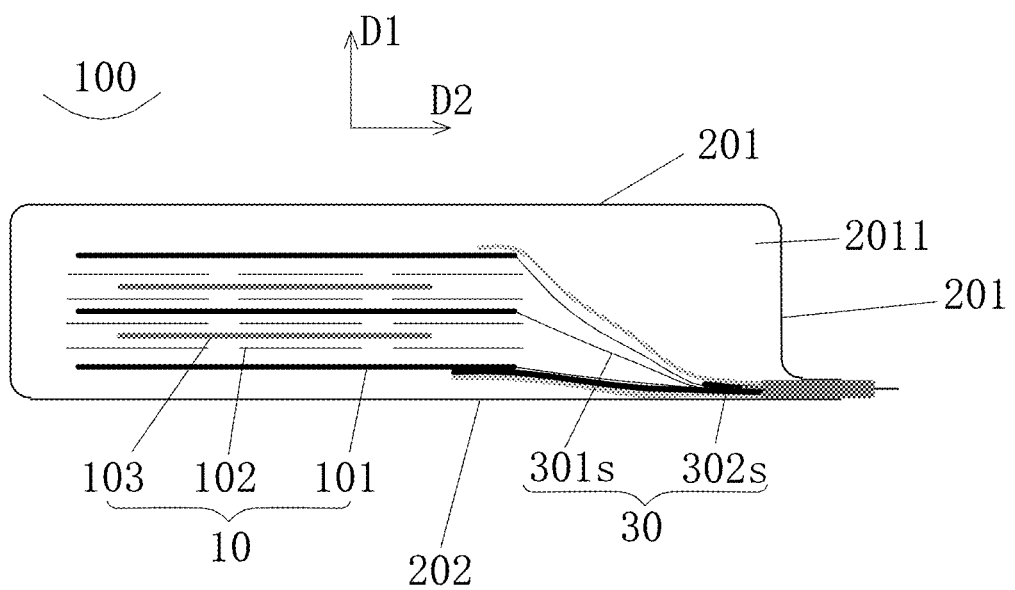
FIG. 7 is a schematic sectional view of a battery cell in yet another implementation according to an embodiment of this application.

It needs to be noted that, referring to FIG. 4 and FIG. 7, in some embodiments, the second recess 2021 may be omitted, and the second bag body 202 covers the opening of the first recess 2011. Therefore, the sealing body 201s formed by the first bag body 201 and the second bag body 202 is flat and straight on a surface of the second bag body 202 away from the first bag body 201. This type of battery cell 100 can meet requirements of different external devices.

Figure 8:
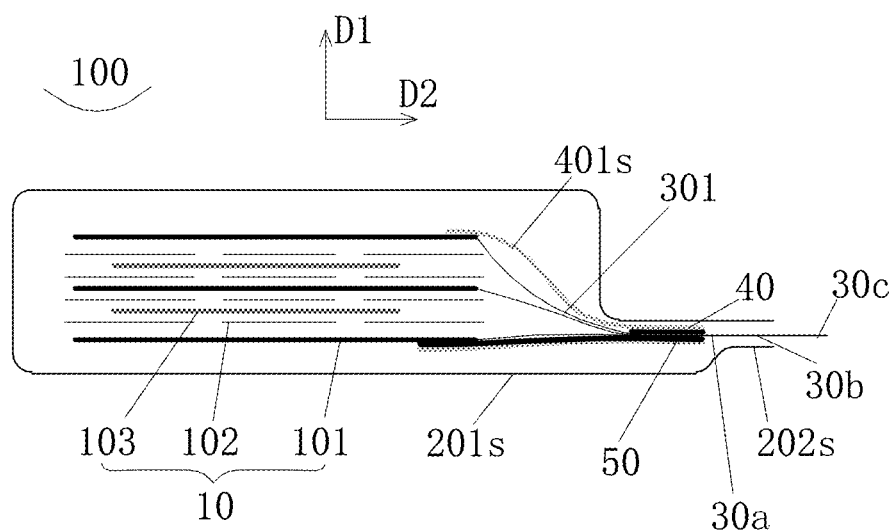
FIG. 8 is yet another manifestation of FIG. 1 according to an embodiment of this application.

With respect to the first tab 30, referring to FIG. 1 and FIG. 8, the first tab 30 includes a first part 30a accommodated in the packaging bag 20, a second part 30b sandwiched at the sealing portion 202s of the packaging bag 20, and a third part 30c protruding from the packaging bag 20. The first tab 30 includes a connecting portion 301. The connecting portion 301 is accommodated in the packaging bag 20. To be specific, the connecting portion 301 is located at the first part 30a of the first tab 30. The connecting portion 301 is configured to connect the first tab 30 and the first electrode plate 101.

It needs to be noted that the first tab 30 protrudes flat and straight from the packaging bag 20, and the direction in which the first tab 30 protrudes from the packaging bag 20 is D2.

Understandably, the direction in which the first tab 30 extends beyond the first electrode plate 101 is the same as the direction D2 in which the first tab 30 protrudes from the packaging bag 20.

It needs to be noted that the thickness direction of the battery cell 100 is D1, the direction in which the first tab 30 extends beyond the first electrode plate 101 is D2, and the width direction of the battery cell is set to D3, where the width direction D3 of the battery cell is perpendicular to the thickness direction D1 of the battery cell 100, and the width direction D3 of the battery cell is perpendicular to the direction D2 in which the first tab 30 extends beyond the first electrode plate 101.

Figure 9:
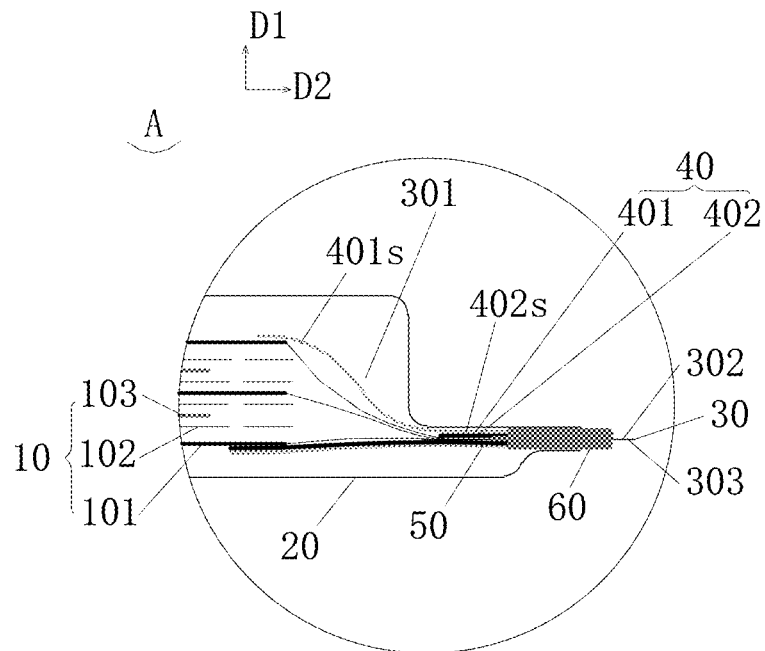
FIG. 9 is another manifestation of an enlarged view of part A shown in FIG. 1 according to an embodiment of this application.

In some embodiments, referring to FIG. 1 and FIG. 9, the first tab 30 possesses a first surface 302 and a second surface 303 that are disposed opposite to each other. The first surface 302 is configured to dispose the first insulation layer 40, and the second surface 303 is configured to dispose the second insulation layer 50. The first surface 302 is parallel to the width direction D3 of the battery cell, and the second surface 303 is parallel to the width direction D3 of the battery cell.

In some embodiments, referring to FIG. 4, the first tab 30 includes a plurality of first tab units 301s and a conductive piece 302s. The plurality of first tab units 301s are connected to the first electrode plate 101 separately, and the plurality of first tab units 301s are stacked. The conductive piece 302s is welded and connected to the plurality of first tab units 301s. The connecting portion 301 includes a weld region; the plurality of first tab units 301s are welded and connected to the conductive piece 302s through the weld region. The conductive piece 302s is partly located in the packaging bag 20, and the conductive piece 302s partly extends out of the packaging bag 20.

It needs to be noted that in this embodiment of this application, because the battery cell 100 is relatively thin, the conductive piece 302s protrudes flat and straight from the packaging bag 20 to alleviate increase of the thickness of the battery cell 100 caused by the bending of the first tab units 301s or the conductive piece 302s.

It needs to be noted that, in some embodiments, the first tab 30 and the current collector of the first electrode plate 101 are integrally formed. When the first tab 30 includes a plurality of first tab units 301s, each of the plurality of first tab units 301s combines with the current collector separately to implement the integral forming. A method for integrally forming the plurality of first tab units 301s and the current collector is to trim the current collector to form the plurality of first tab units 301s. The plurality of first tab units 301s are stacked along the thickness direction of the battery cell 100. The ends that are of the plurality of first tab units 301s and that are away from the current collector are combined and clustered and are electrically connected to the conductive piece 302s. The conductive piece 302s protrudes from the packaging bag so as to be available for connecting an external circuit.

It needs to be noted that, in some embodiments, the first tab 30 and the current collector of the first electrode plate 101 are welded together. When the first tab 30 includes a plurality of first tab units 301s, each of the plurality of first tab units 301s is welded to the current collector separately. The ends that are of the plurality of first tab units 301s and that are away from the current collector are all welded to the conductive piece 302s.

It needs to be noted that, with respect to the second tab 70, referring to FIG. 2, the second tab 70 is connected to the second electrode plate 103. The structure of the second tab 70 may be the same as the first tab 30. For the disposition relationship between the second tab 70 and the packaging bag 20, reference may be made to the disposition relationship between the first tab 30 and the packaging bag 20, and details are omitted here.

Figure 10:
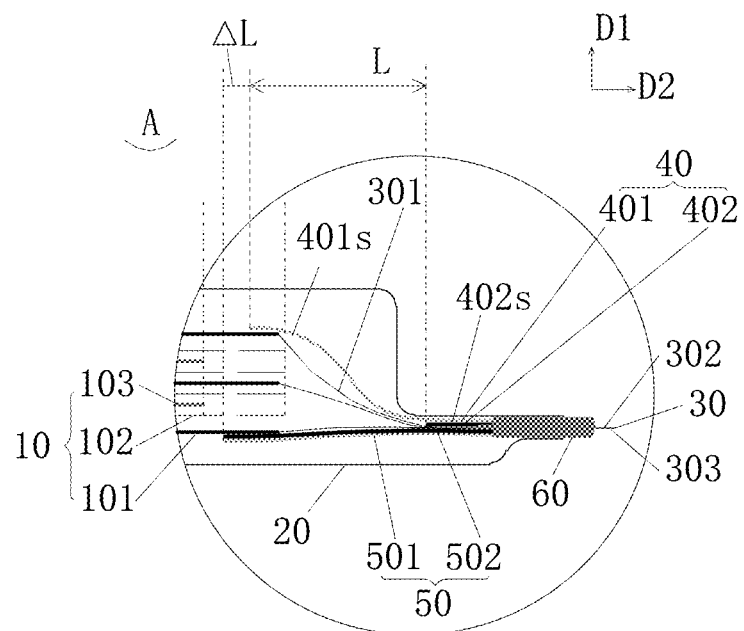
FIG. 10 is still another manifestation of an enlarged view of part A shown in FIG. 1 according to an embodiment of this application.

With respect to the first insulation layer 40, referring to FIG. 1 and FIG. 10, the first insulation layer 40 includes a substrate layer 401 and an adhesive layer 402. The adhesive layer 402 is configured to bond to the first tab 30. The substrate layer 401 is configured to dispose the adhesive layer 402. The free end 401s of the first insulation layer 40 is formed by the region of the substrate layer 401, which is towards the electrode assembly 10 and not covered by the adhesive layer 402, that is, by the region of the substrate layer 401, which is towards the electrode assembly 10 and exposed. The first insulation layer 40 protects the connecting portion 301 that connects the first electrode plate 101 and the first tab 30, thereby reducing the hazard that the first tab 30 or the first electrode plate 101 is prone to pierce the packaging bag 20 to cause corrosion.

With respect to the free end 401s, the free end 401s is non-adhesive, and the free end 401s is insulated. As hampered by the processing conditions and other factors, the joint between the first tab 30 and the first electrode plate 101 is unable to be protected by being bonded to the tab adhesive 60. The solution is to dispose the first insulation layer 40, and dispose the free end 401s on the first insulation layer 40. The free end 401s does not need to be bonded to the connecting portion 301 of the first tab 30. Therefore, the free end 401s disposed solves the following defect in the prior art: as limited by the processing conditions, the end of the first tab 30 towards the electrode assembly 10 is unable to be reached and protected by the tab adhesive 60.

An end of the first insulation layer 40 away from the electrode assembly 10 is a first end 402s. The first end 402s overlaps the tab adhesive 60. In some embodiments, along the direction D2 in which the first tab 30 extends beyond the first electrode plate 101, the length of overlap between the first end 402s and the tab adhesive 60 is 0.3 mm to 0.8 mm. In another embodiment, the length of overlap between the first end 402s and the tab adhesive 60 is 0.5 mm.

It needs to be noted that the part of overlap between the first end 402s and the tab adhesive 60 is accommodated in the packaging bag 20.

Understandably, the first end 402s includes an adhesive layer 402 and a part of the substrate layer 401. In some embodiments, the adhesive layer 402 is adhesive on both sides. The adhesive layer 402 bonds the substrate layer 401 to the tab adhesive 60. To be specific, the free end 401s is bonded to the tab adhesive 60 through the adhesive layer 402. This is equivalent to extending the length of the tab adhesive 60 to the connecting portion 301, or equivalent to extending the length of the tab adhesive 60 to the connecting portion 301 and the first electrode plate 101. By protecting the joint between the first tab 30 and the first electrode plate 101, the free end 401s reduces the hazard that the first tab 30 or the first electrode plate 101 is prone to pierce the packaging bag 20 to cause corrosion.

Figure 11:
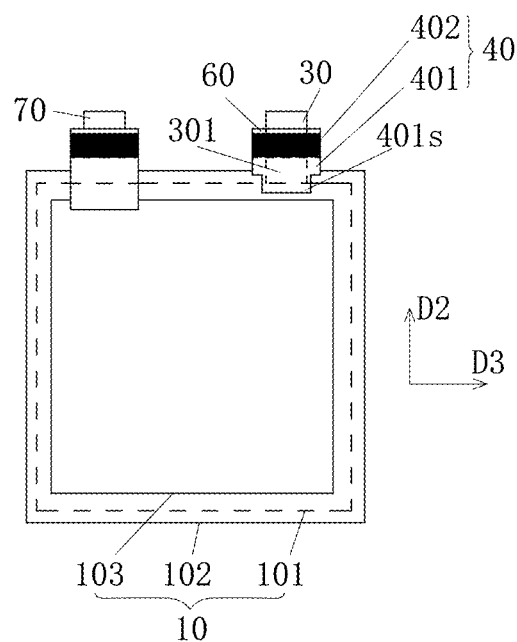
FIG. 11 is a partial schematic diagram of a battery cell in still another implementation according to an embodiment of this application.
Figure 12:
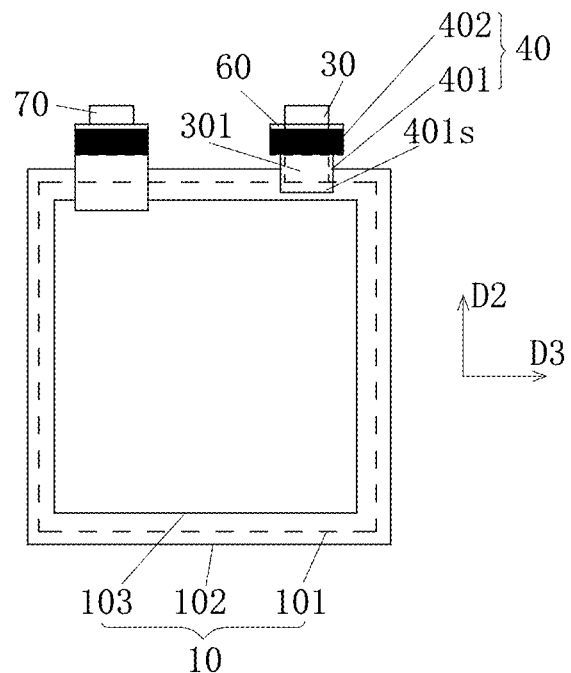
FIG. 12 is a partial schematic diagram of a battery cell in yet another implementation according to an embodiment of this application.

It needs to be noted that, referring to FIG. 11 and FIG. 12, the size of the tab adhesive 60 along the width direction D3 of the battery cell is larger than the size of the first tab 30 along the width direction D3 of the battery cell. Along the width direction D3 of the battery cell, the tab adhesive 60 completely covers the first tab 30.

It needs to be noted that the size of the first insulation layer 40 along the width direction D3 of the battery cell is larger than the size of the first tab 30 along the width direction D3 of the battery cell. Along the width direction D3 of the battery cell, the first insulation layer 40 completely covers the first tab 30.

It needs to be noted that the size of the free end 401s along the width direction D3 of the battery cell is larger than the size of the first tab 30 along the width direction D3 of the battery cell. Along the width direction D3 of the battery cell, the free end 401s completely covers the first tab 30.

Understandably, referring to FIG. 11 and FIG. 12, along the width direction D3 of the battery cell, the part of overlap between the free end 401s, the substrate layer 401, and the adhesive layer 402, as well as the size of the adhesive layer 402, may be the same or different, as long as the following is ensured: the size of the first insulation layer 40 along the width direction D3 of the battery cell is larger than the size of the first tab 30 along the width direction D3 of the battery cell, and, along the width direction D3 of the battery cell, the first insulation layer 40 completely covers the first tab 30.

It needs to be noted that, in some embodiments, referring to FIG. 1 and FIG. 10, along the direction D2 in which the first tab 30 extends beyond the first electrode plate 101, the length of the free end 401s is L, where 0.5 mm≤L≤8 mm. In some embodiments, 0.6 mm≤L≤3 mm. In some embodiments, 1.5 mm≤L≤3 mm.

It needs to be noted that the length L of the free end 401s may vary with the preparation technique in the process of preparing the battery cell 100. For example, when the external device part occupies a relatively large working space, the length of the free end 401s may be increased appropriately. When the external device part occupies a small space, the length of the free end 401s may be decreased.

It needs to be noted that, in some embodiments, referring to FIG. 1 and FIG. 10, along the direction D2 in which the first tab 30 extends beyond the first electrode plate 101, the separator 102 extends beyond the first electrode plate 101. Along the thickness direction D1 of the battery cell 100, the orthographic projection of the free end 401s of the first insulation layer 40 meets or overlaps the orthographic projection of the separator 102, thereby reducing the hazard that the first electrode plate 101 and the second electrode plate 103 contact at the connecting portion 301 to cause electric leakage.

It needs to be noted that, in some embodiments, referring to FIG. 1, FIG. 2, and FIG. 10, along the direction D2 in which the first tab 30 extends beyond the first electrode plate 101, the separator 102 extends beyond the first electrode plate 101. Along the thickness direction D1 of the battery cell 100, the orthographic projection of the free end 401s of the first insulation layer 40 meets or overlaps the orthographic projection of the separator 102. Along the direction D2 in which the first tab 30 extends beyond the first electrode plate 101, the first electrode plate 101 extends beyond the second electrode plate 103. Along the thickness direction D1 of the battery cell 100, the orthographic projection of the free end 401s of the first insulation layer 40 is spaced apart from the orthographic projection of the second electrode plate 103. In this way, the disposition of the first insulation layer 40 does not increase the thickness of the battery cell 100 at an end of the second electrode plate 103 towards the second tab 70.

It needs to be noted that, in some embodiments, along the direction D2 in which the first tab 30 extends beyond the first electrode plate 101, the length by which the first electrode plate 101 extends beyond the second electrode plate 103 is 0.87 mm.

With respect to the first insulation layer 40 and the second insulation layer 50, referring to FIG. 1 and FIG. 10, the first insulation layer 40 is disposed on a first surface 302 of the first tab 30, and the second insulation layer 50 is disposed on a second surface 303 of the first tab 30. The first surface 302 and the second surface 303 are disposed opposite to each other, and therefore, the first insulation layer 40 and the second insulation layer 50 are disposed opposite to each other.

It needs to be noted that, along the direction D2 in which the first tab 30 extends beyond the first electrode plate 101, the length of the second insulation layer 50 is greater than the length of the first insulation layer 40.

It needs to be noted that, along the thickness direction D1 of the battery cell 100, the orthographic projection of an end of the second insulation layer 50 towards the electrode assembly 10 is spaced apart from or meets the orthographic projection of the second electrode plate 103. In this way, the disposition of the second insulation layer 50 does not increase the thickness of the battery cell 100 at an end of the second electrode plate 103 towards the second tab 70.

It needs to be noted that the second insulation layer 50 includes a protection layer 501 and a bonding layer 502. The protection layer 501 and the bonding layer 502 are stacked. The bonding layer 502 bonds to the second surface 303 of the first tab 30. Both the protection layer 501 and the bonding layer 502 extend to the joint between the first electrode plate 101 and the first tab 30. In some embodiments, the protection layer 501 and the bonding layer 502 further extend to the first electrode plate 101. The second surface 303 of the first electrode plate 101 is not significantly hampered by the processing conditions or other factors, that is, not significantly hampered by burrs, external devices, or the like. Therefore, the second insulation layer can be bonded to the second surface 303.

It needs to be noted that, in some embodiments, along a direction in which the free end 401s points to the first electrode plate 101, that is, in a direction opposite to the direction D2 in which the first tab 30 extends beyond the first electrode plate 101, the length by which the second insulation layer 50 extends beyond the first insulation layer 40 is $\Delta L$, where $0 < \Delta L \leq 3$ mm. In this way, on the one hand, the second insulation layer 50 disposed reduces the hazard that the first tab 30 or the first electrode plate 101 is prone to pierce the packaging bag 20 to cause corrosion. On the other hand, the disposition of the second insulation layer 50 does not affect the performance of the battery cell 100.

In this embodiment of this application, the battery cell 100 includes an electrode assembly 10 and a packaging bag 20 configured to accommodate the electrode assembly 10. The electrode assembly 10 includes a first electrode plate 101, a separator 102, and a second electrode plate 103 that are stacked in sequence. The first tab 30 is disposed on the first electrode plate 101. The first tab 30 protrudes from the packaging bag 20. The first tab 30 includes a connecting portion 301 accommodated in the packaging bag 20. The connecting portion 301 is configured to connect the first tab 30 and the first electrode plate 101. The first insulation layer 40 is disposed on the connecting portion 301, and the first insulation layer 40 includes the free end 401s towards the electrode assembly 10. The free end 401s is configured to protect the joint between the first tab 30 and the first electrode plate 101. With the first insulation layer 40 disposed at the connecting portion 301 of the first tab 30, where the first insulation layer 40 includes the free end 401s towards the electrode assembly 10, the joint between the first tab 30 and the first electrode plate 101 is protected by the free end 401s of the first insulation layer 40, thereby reducing the hazard that the first tab 30 or the first electrode plate 101 is prone to pierce the packaging bag 20 to cause corrosion.

An embodiment of this application further provides an electric device. The electric device includes a load and the battery cell 100. The battery cell 100 is connected to the load, and the battery cell 100 is configured to supply power to the load.

The electric device may be an energy storage product, a mobile phone, a tablet, an unmanned aerial vehicle, a single-wheel electric vehicle, an electric vehicle with two or more wheels, an electric cleaning tool, or the like.

For example, for the unmanned aerial vehicle, a battery pack is mounted in the unmanned aerial vehicle. The battery pack is configured to supply power to the loads such as a flight system, a control system, and a camera system in the unmanned aerial vehicle.

It needs to be noted that although preferred embodiments of this application have been described in the specification and drawings of this application, this application may be implemented in many different forms, without being limited to the embodiments described in this specification. The embodiments are not intended as additional limitations on the content of this application, and the embodiments are provided merely to enable more thorough and comprehensive understanding of the content disclosed herein. In addition, all kinds of embodiments that are not enumerated above but are derived by further combination of the foregoing technical features fall within the scope covered by the specification of this application. Further, all improvements and variations, which may be made by a person of ordinary skill in the art based on the foregoing description, fall within the protection scope of the claims appended hereto.

What is claimed is:

1. A battery cell, comprising:
    an electrode assembly, and a packaging bag accommodating the electrode assembly,
    wherein the electrode assembly comprises a first electrode plate, a separator, and a second electrode plate stacked together along a thickness direction of the battery cell, and the electrode assembly further comprises a first tab;
    wherein a first end of the first tab protrudes from the packaging bag, and a second end of the first tab comprises a connecting portion accommodated in the packaging bag, and the connecting portion is connected to the first electrode plate inside the packaging bag;
    wherein a first insulation layer is disposed between the connecting portion and the packaging bag, one end of the first insulation layer is a free end; and
    wherein the free end extends in the packaging bag from over the connecting portion to over the first electrode plate in a direction substantially parallel to the first electrode plate, covering a joint between the first electrode plate and the connecting portion, and another end of the first insulation layer extends away from the first electrode plate.

2. The battery cell according to claim 1, wherein the first insulation layer comprises a substrate layer and an adhesive layer disposed on the substrate layer, and the adhesive layer bonds to the first tab; and the free end is an exposed substrate layer.

3. The battery cell according to claim 2, wherein along a direction in which the first tab extends beyond the first electrode plate, a length of the free end is L, wherein $0.5 \text{ mm} \leq L \leq 8 \text{ mm}$.

4. The battery cell according to claim 3, wherein $0.6 \text{ mm} \leq L \leq 3 \text{ mm}$.

5. The battery cell according to claim 3, wherein $1.5 \text{ mm} \leq L \leq 3 \text{ mm}$.

6. The battery cell according to claim 1, wherein
    along a direction in which the first tab extends beyond the first electrode plate, the separator extends beyond the first electrode plate; and
    along the thickness direction of the battery cell, an orthographic projection of the free end of the first insulation layer meets or overlaps an orthographic projection of the separator.

7. The battery cell according to claim 6, wherein
    along the direction in which the first tab extends beyond the first electrode plate, the first electrode plate extends beyond the second electrode plate; and
    along the thickness direction of the battery cell, the orthographic projection of the free end of the first insulation layer is spaced apart from an orthographic projection of the second electrode plate.

8. The battery cell according to claim 1, wherein
    the first tab comprises a first surface and a second surface opposite to the first surface;
    the first insulation layer is disposed on the first surface; and a second insulation layer is disposed on the second surface; and
    along a direction in which the first tab extends beyond the first electrode plate, a length of the second insulation layer is greater than a length of the first insulation layer.

9. The battery cell according to claim 8, wherein along a direction in which the free end points to the first electrode plate, a length by which the second insulation layer extends beyond the first insulation layer is $\Delta L$, wherein $0 \text{ mm} < \Delta L \leq 3 \text{ mm}$.

10. The battery cell according to claim 1, wherein
    the first tab comprises a plurality of first tab units stacked and a conductive piece welded and connected to the plurality of first tab units; and the connecting portion comprises a weld region;
    the plurality of first tab units are welded and connected to the conductive piece through the weld region.

11. The battery cell according to claim 1, wherein
    the first electrode plate comprises a current collector and an active layer disposed on the current collector;
    the current collector protrudes from the first electrode plate to form the first tab.

12. The battery cell according to claim 11, wherein the active layer extends beyond the first electrode plate and is disposed on the first tab, and a distance by which the active layer extends beyond the first electrode plate is not greater than 0.9 mm.

13. The battery cell according to claim 1, wherein a thickness of the battery cell is H, wherein $0 \text{ mm} < H \leq 3 \text{ mm}$.

14. The battery cell according to claim 13, wherein $1.5 \text{ mm} \leq H \leq 1.8 \text{ mm}$.

15. The battery cell according to claim 1, wherein
    the packaging bag comprises a first bag body and a second bag body, a first recess is disposed on the first bag body, an edge of the second bag body is connected to an edge of the first bag body to form a sealing body and a sealing portion;
    the electrode assembly is accommodated in the sealing body, and the first tab is sandwiched at the sealing portion.

16. The battery cell according to claim 15, wherein a second recess is disposed on the second bag body, and the first recess fits the second recess to form the sealing body.

17. The battery cell according to claim 15, wherein a tab adhesive is applied to both surfaces of the first tab sandwiched at the sealing portion, and the tab adhesive is configured to seal the first tab and the sealing portion.

18. The battery cell according to claim 17, wherein the another end of the first insulation layer overlaps the tab adhesive.

19. The battery cell according to claim 1, wherein the first tab extends flat and straight out of the packaging bag.

20. An electric device, comprising:
    a load and a battery cell;
    wherein the load is electrically connected to the battery cell, the battery cell comprises an electrode assembly and a packaging bag accommodating the electrode assembly,
    wherein the electrode assembly comprises a first electrode plate, a separator, and a second electrode plate stacked together along a thickness direction of the battery cell, and a the electrode assembly further comprises a first tab;
    wherein a first end of the first tab protrudes from the packaging bag, and a second end of the first tab comprises a connecting portion accommodated in the packaging bag, and the connection portion is connected to the first electrode plate inside the packaging bag;
    wherein a first insulation layer is disposed between the electrode assembly and the packaging bag, one end of the first insulation layer is a free end; and
    wherein the free end extends in the packaging bag from over the connecting portion to over the first electrode plate in a direction substantially parallel to the first electrode plate, covering a joint between the first electrode plate and the connecting portion. and another end of the first insulation layer extends away from the first electrode plate.

* * * * *